Patented Dec. 10, 1929

1,738,976

UNITED STATES PATENT OFFICE

FERNANDO SOMOZA VIVAS, OF LOS ANGELES, CALIFORNIA, ASSIGNOR TO INTERNATIONAL FIREPROOF PRODUCTS CORPORATION, OF NEW YORK, N. Y., A CORPORATION OF DELAWARE

PROCESS FOR FIREPROOFING CELLULOSE

No Drawing. Application filed March 11, 1927. Serial No. 174,638.

The invention relates to the fireproofing of cellulose and has as an object the treatment of cellulose either in the form of wallboard made of wood pulp, bagasse or the like, fabrics or the like after their manufacture or the treatment of cellulose material during the manufacture of such products.

It is a further object of the invention to treat material made of cellulose either during its manufacture or after the manufacture thereof so as to render the same fireproof.

For the purpose of the invention a solution is first made as follows, mixed in the order named:

| | |
|---|---|
| Water | One gallon |
| Boric acid | Six ounces |
| Borax | Eight ounces |
| Ammonium sulphate | Ten ounces |
| Sodium tungstate | Two ounces |

The material to be treated is saturated with this solution at a temperature of substantially 120° F. and after thorough saturation, the material is dried to the point of removal of substantially fifty per cent of the moisture.

The thus treated material is then immersed in a solution made as follows:

| | |
|---|---|
| Water | One gallon |
| Calcium chloride | One pound |

The material is immersed in the latter soluton at atmospheric temperature and after thorough saturation thereby, the material is removed and dried in air.

As a result of the treatment, gypsum and calcium tungstate are deposited in the pores of the material making the material fireproof and much stronger with an increase of weight of only substantially three per cent.

A piece of wall board sold under the trademark "Celotex", one half inch in thickness after treatment as above has been subjected to the action of a gasoline blow torch at an estimated temperature of 1200° F. to 1400° F., the blow torch being placed at a distance of three inches from the material, for a period of one-half hour without causing combustion of the material.

Minor changes in the steps of the process or in the proportions of the solutions used may be made within the scope of the appended claims without departing from the spirit of the invention.

I claim:

1. The process of treating cellulose which comprises impregnating the material with boric acid, borax, ammonium sulphate and sodium tungstate, then treating the impregnated substance with calcium chloride.

2. The process of treating cellulose which comprises impregnating the material with a solution of boric acid, borax, ammonium sulphate, and sodium tungstate, removing a portion of the solvent, then treating the substance with a solution of calcium chloride.

3. The process of treating cellulose which comprises impregnating the material with a warm aqueous solution of boric acid, borax, ammonium sulphate, and sodium tungstate, partially drying the impregnated substance, then impregnating the material with an aqueous solution of calcium chloride and drying the material in air.

In testimony whereof I affix my signature.

FERNANDO SOMOZA VIVAS.